United States Patent
Godfrey et al.

(10) Patent No.: US 8,691,333 B2
(45) Date of Patent: Apr. 8, 2014

(54) METHODS FOR MANUFACTURING ENGINE COMPONENTS WITH STRUCTURAL BRIDGE DEVICES

(75) Inventors: Donald G. Godfrey, Phoenix, AZ (US); Daniel Ryan, Phoenix, AZ (US); Mark C. Morris, Phoenix, AZ (US); Vincent Chung, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 211 days.

(21) Appl. No.: 13/171,218

(22) Filed: Jun. 28, 2011

(65) Prior Publication Data

US 2013/0004680 A1 Jan. 3, 2013

(51) Int. Cl.
*B05D 3/00* (2006.01)

(52) U.S. Cl.
USPC ............ 427/189; 427/180; 427/190; 427/191

(58) Field of Classification Search
USPC .................................. 427/180, 189, 190, 191
See application file for complete search history.

(56) References Cited

U.S. PATENT DOCUMENTS

| | | | |
|---|---|---|---|
| 5,352,405 A | 10/1994 | Beaman et al. | |
| 5,745,834 A | 4/1998 | Bampton et al. | |
| 5,753,274 A | 5/1998 | Wilkening et al. | |
| 5,897,825 A * | 4/1999 | Fruth et al. | 264/401 |
| 6,610,230 B2 * | 8/2003 | Jiang et al. | 264/161 |
| 6,656,409 B1 | 12/2003 | Keicher et al. | |
| 6,815,636 B2 | 11/2004 | Chung et al. | |
| 7,073,561 B1 * | 7/2006 | Henn | 164/94 |
| 7,521,652 B2 | 4/2009 | Chung et al. | |
| 7,718,933 B2 | 5/2010 | Huskamp | |
| 2001/0014403 A1 * | 8/2001 | Brown et al. | 428/539.5 |
| 2004/0056022 A1 | 3/2004 | Meiners et al. | |
| 2004/0191064 A1 * | 9/2004 | Guo | 416/191 |
| 2005/0208203 A1 | 9/2005 | Church et al. | |
| 2005/0268998 A1 | 12/2005 | Bostanjoglo et al. | |
| 2007/0026145 A1 | 2/2007 | Lindemann et al. | |
| 2007/0105395 A1 | 5/2007 | Kinzel et al. | |
| 2009/0277540 A1 | 11/2009 | Langlet | |
| 2010/0320649 A1 | 12/2010 | Niebling | |
| 2012/0201686 A1 | 8/2012 | Fromentin et al. | |

FOREIGN PATENT DOCUMENTS

| | | |
|---|---|---|
| EP | 2022622 A1 | 2/2009 |
| FR | 2962357 A1 | 1/2012 |
| WO | 2012146746 A1 | 11/2012 |

OTHER PUBLICATIONS

EP Communication for EP 12172846.3-2122 dated Apr. 12, 2012.
Daniel Ryan, et al.; Methods for Manufacturing Turbine Components, filed with the USPTO on Jun. 22, 2010 and assigned U.S. Appl. No. 12/820,652.
EPO, European Search Report issued in Application No. 12172846.3, dated Nov. 15, 2012.

* cited by examiner

*Primary Examiner* — Dah-Wei Yuan
*Assistant Examiner* — Ngaleung V Law
(74) *Attorney, Agent, or Firm* — Ingrassia Fisher & Lorenz, P.C.

(57) ABSTRACT

A method is provided for manufacturing an engine component. The method includes providing a structural bridge device on a base block; forming a component portion on the structural bridge device with an additive manufacturing technique; removing the component portion from the base block and the structural bridge device; and finishing the component portion to form the engine component.

12 Claims, 7 Drawing Sheets

METHODS FOR MANUFACTURING ENGINE COMPONENTS WITH STRUCTURAL BRIDGE DEVICES

TECHNICAL FIELD

The present invention generally relates to turbine engines, and more particularly relates to methods for manufacturing turbine components or other components for engines.

BACKGROUND

Gas turbine engines are generally known in the art and used in a wide range of applications, such as propulsion engines and auxiliary power unit engines for aircraft. In a typical configuration, a turbine section of the engine includes turbine components such as rows of stator vanes and rotor blades disposed in an alternating sequence along the axial length of a generally annular hot gas flow path. The rotor blades are mounted on the periphery of rotor disks coupled to a main engine shaft. The stator vanes are coupled to inner and outer endwalls and optimally direct hot combustion gases to the rotor blades, thus resulting in rotary driving of the rotor disks to provide an engine output.

The stator vanes and rotor blades typically have arcuate shapes with generally concave pressure sides and generally convex suction sides extending axially in chords between opposite leading and trailing edges. During operation, the aerodynamic contours of the stator vanes and rotor blades, and corresponding flow passages therebetween, are configured in an attempt to maximize energy extraction from the combustion gases. Since higher engine efficiencies may occur at higher temperatures, some turbine components may additionally include internal cooling passages to enable such high temperature operation.

Given these considerations, turbine components may have relatively complex three-dimensional (3D) geometries that may raise difficult fabrication and repair issues. Conventional fabrication techniques include forging, casting, and/or machining. For example, in one conventional casting process, a ceramic core is assembled into a wax tool that will provide the external shape of the component, the core is encased in wax, a ceramic shell is formed around the wax pattern, and the wax is removed to form a ceramic mold. Molten metal is then poured into the mold, cooled and solidified, and then the external shell and internal core are suitably removed to result in the desired turbine component. The cast turbine component may then undergo subsequent manufacturing processes such as machining, electrical discharge machining (EDM) or laser drilling. Such prior art methods are not only expensive and have long lead-times, but may additionally have low yields, particularly in turbine components with complex internal structures such as cooling passages.

Accordingly, it is desirable to provide improved manufacturing methods for turbine components that enable improved cycle times and reduced costs without sacrificing component performance or durability. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method is provided for manufacturing an engine component. The method includes providing a structural bridge device on a base block; forming a component portion on the structural bridge device with an additive manufacturing technique; removing the component portion from the base block and the structural bridge device; and finishing the component portion to form the engine component.

In accordance with another exemplary embodiment, a method is provided for manufacturing an engine component. The method includes forming a component portion with a direct metal laser fusion (DMLF) process; forming a structural bridge device on the component portion with the DMLF process; removing the component portion from the base block and the structural bridge device; and finishing the component portion to form the engine component.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include methods for manufacturing turbine components or other components of gas turbine engines. An intermediate turbine article is initially formed with an additive manufacturing technique such as direct metal laser fusion in which sequential layers of build material are fused and solidified according to a 3D model. The intermediate turbine article is formed with a first structural bridge device that functions to thermally isolate a turbine component portion of the intermediate turbine article from an underlying base block. The thermal isolation prevents or mitigates thermal gradients from forming between the relatively high temperature turbine component portion and the relatively low temperature base block, which could otherwise lead to thermal stresses and weaknesses. The intermediate turbine article is also formed with a second structural bridge device that functions to retain the dimensions of the turbine component portion of the intermediate turbine article, particularly the dimensions of thin-walled tip areas during a subsequent stress relief heat treatment. Upon completion of the stress relief treatment, the first and second structural bridge devices are removed, and the turbine component portion undergoes additional treatments, if necessary, to form the final turbine component.

Figure 1:
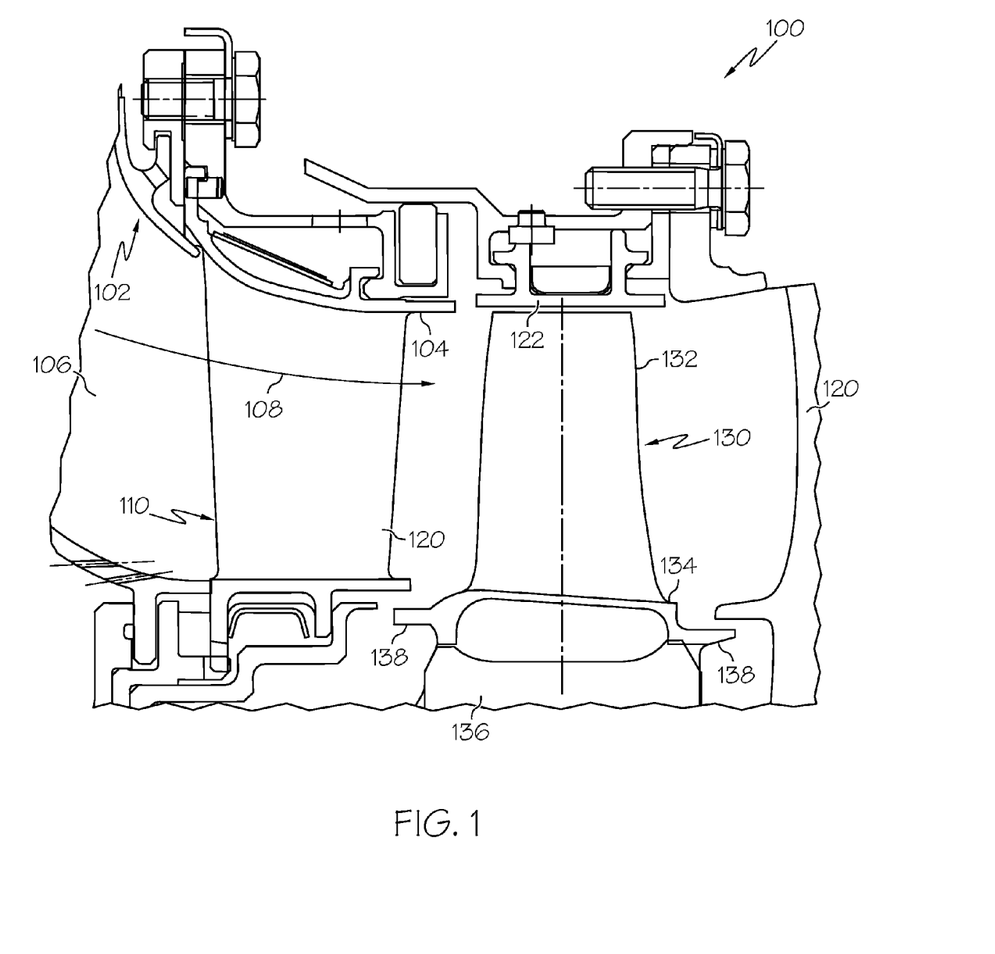
FIG. 1 is a partial cross-sectional view of a turbine section of a gas turbine engine assembly in accordance with an exemplary embodiment.

FIG. 1 is a partial cross-sectional view of a turbine section 100 of a gas turbine engine assembly in accordance with an exemplary embodiment. The turbine section 100 and gas turbine engine assembly have an overall construction and operation that is generally understood by persons skilled in the art. In general terms, the turbine section 100 has a housing 102 with an annular duct wall 104 that defines a mainstream hot gas flow path 106 for receiving a flow of mainstream combustion gases 108 from an engine combustor (not shown). The housing 102 additionally houses at least one stator assembly 110 with stator vanes 120 and at least one turbine rotor assembly 130 with turbine rotor blades (or airfoils) 132. The rotor blades 132 of the turbine rotor assembly 130 project radially outward toward a shroud flange 122 from a turbine rotor platform 134 that is coupled to a turbine disk 136, which in turn circumscribes a shaft (not shown). The rotor platform 134 may include one or more flow discouragers 138 that assist in maintaining efficient air flow along the mainstream hot gas flow path 106.

During operation, the combustion gases 108 flow past axially spaced circumferential rows of stator vanes 120 and rotor blades 132 to drive the rotor blades 132 and the associated turbine rotor assembly 130 for power extraction. Other embodiments may have different configurations.

Figure 2:
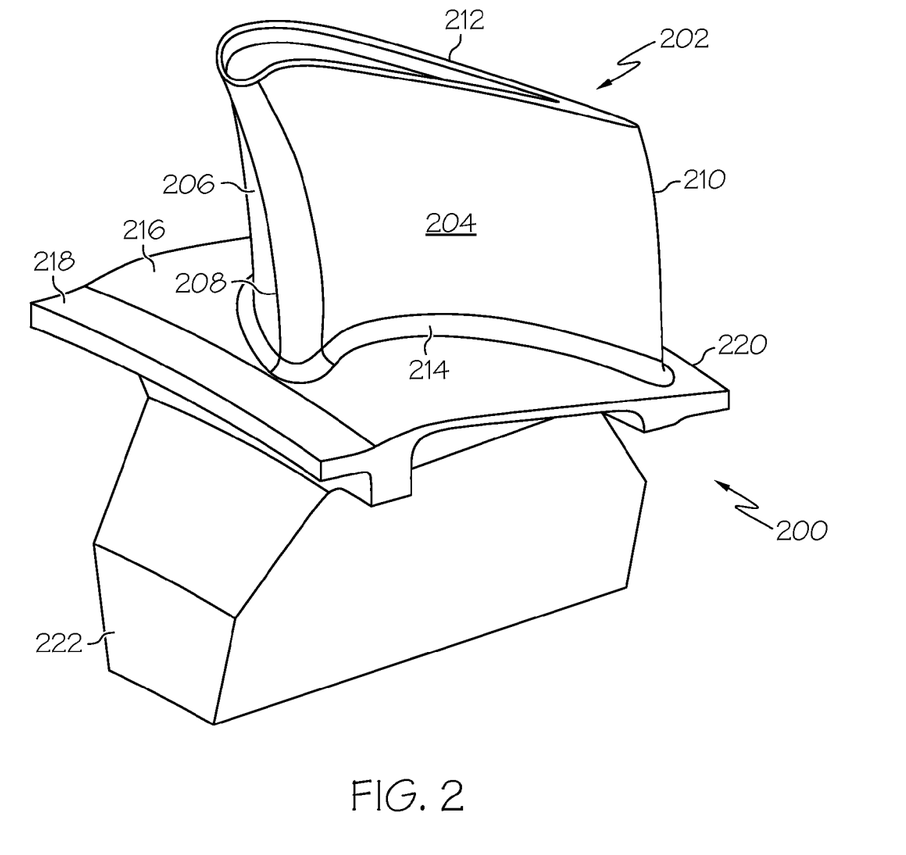
FIG. 2 is an isometric view of a turbine component in accordance with an exemplary embodiment.

FIG. 2 is an isometric view of a turbine component 200 in accordance with an exemplary embodiment and generally illustrates the relatively complex 3D geometric configuration typical of a turbine component, for example, that may be incorporated into the turbine section 100 of FIG. 1. Although the turbine component 200 in FIG. 2 is depicted as a rotor blade, such as rotor blade 132 (FIG. 1), the exemplary embodiments discussed herein are applicable to any type of turbine component, including stator vanes, such as stator vanes 120 (FIG. 1), turbine shrouds, such as shroud flanges 122 (FIG. 1), and other types of engine components.

The turbine component 200 may include an airfoil 202 with a generally concave pressure side 204 and a generally convex suction side 206 opposed thereto and joined at a leading edge 208 and a trailing edge 210. In a radial direction, the airfoil 202 extends from a tip 212 to a root 214, which is coupled to a platform 216 that defines an inner boundary for the hot combustion gases that pass over airfoil 202 during engine operation. The platform 216 may further include flow discouragers 218 and 220 that function to discourage hot gas ingestion into undesired areas. A mounting dovetail 222 may be integrally formed on the underside of the platform 216 for mounting the turbine component 200 within the turbine section 100 (FIG. 1). In some exemplary embodiments, the turbine component 200 may include internal passages or hollow areas to provide a cooling flow during engine operation, although in other embodiments, the turbine component 200 may be solid.

Figure 3:
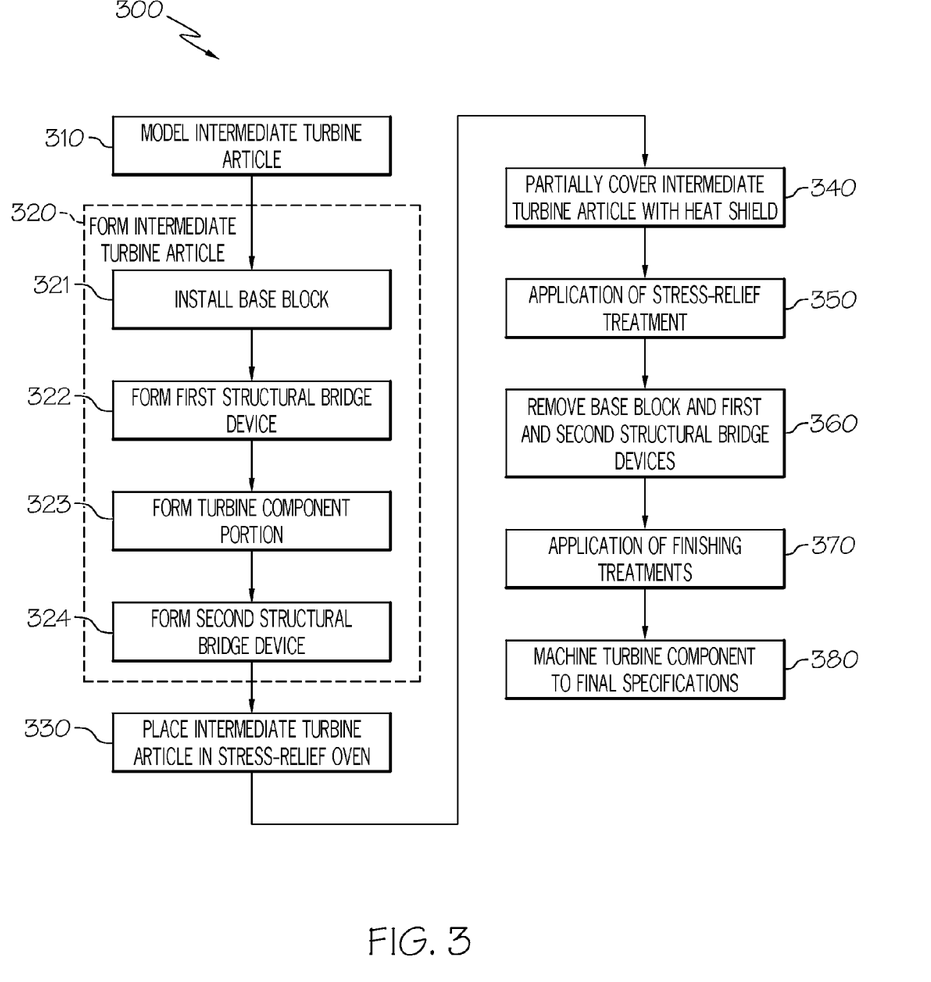
FIG. 3 is a flowchart of a method for manufacturing the turbine component of FIG. 2 in accordance with an exemplary embodiment.
Figure 4:
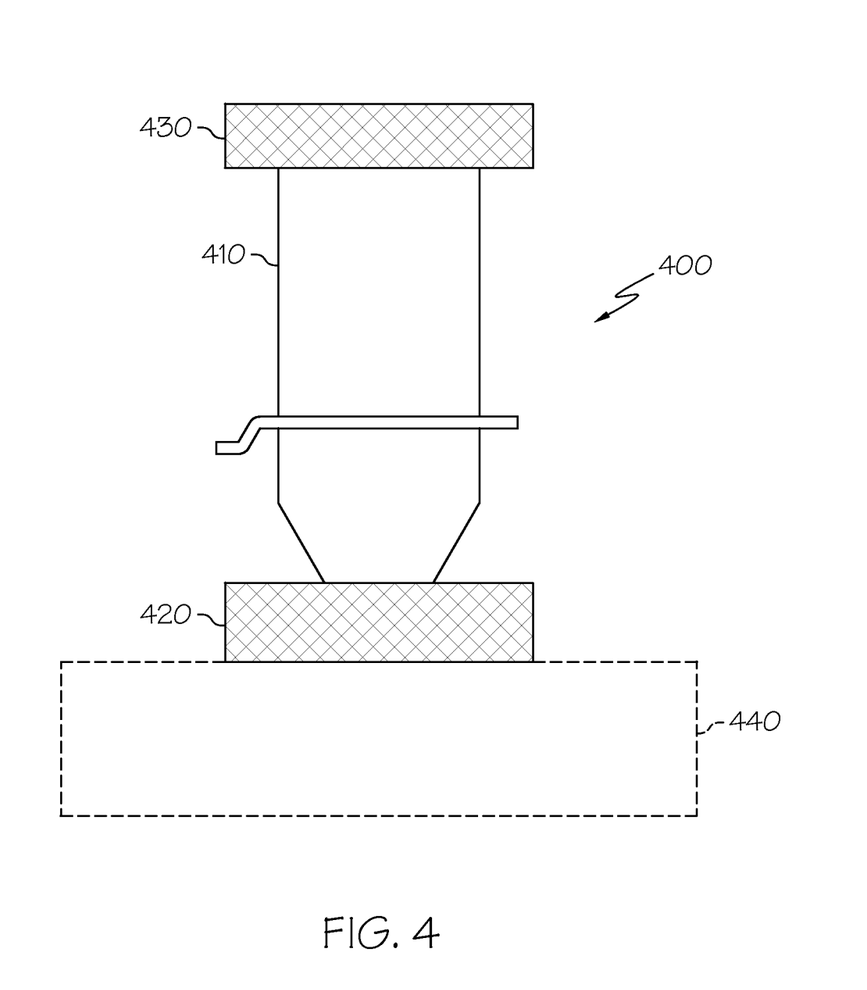
FIG. 4 is an elevation view of an intermediate turbine article formed in the method of FIG. 3 in accordance with an exemplary embodiment.

FIG. 3 is a flowchart of a method 300 for manufacturing a turbine component, such as the turbine component 200 of FIG. 2, in accordance with an exemplary embodiment. Although method 300 refers to manufacturing turbine components, the method 300 may be suitable for manufacturing other components of an engine, including fan components, compressor components, combustor components, and/or other engine components. In a first step 310, a model, such as a design model, of an intermediate turbine article may be defined in any suitable manner. Reference is briefly made to FIG. 4, which is an elevation view of an exemplary intermediate turbine article 400 that is modeled in step 310.

As shown in FIG. 4, the intermediate turbine article 400 may include a turbine component portion 410, a first structural bridge device 420, and a second structural bridge device 430. As shown in dashed lines in FIG. 4, the intermediate turbine article 400 is designed to be formed on a base block 440. The intermediate turbine article 400 will be discussed in greater detail below, but generally, the turbine component portion 410 refers to the portion of the intermediate turbine article 400 that corresponds to the dimensions of the finished turbine component, such as component 200 of FIG. 2. The first structural bridge device 420 provides thermal isolation between the base block 440 and the rest of the intermediate turbine article 400, and the first and second structural bridge devices 420 and 430 provide structural restraint for maintaining the shape of the turbine component portion 410 during the processing steps discussed below. FIG. 4 will be referenced below in the further discussion of the method 300. As noted above, if the method 300 is used to manufacture another type of engine component, the intermediate article may include another type of component portion, a first structural bridge device, and a second structural bridge device.

Returning to step 310 of the method 300, the model may be designed with computer aided design (CAD) software and include 3D numeric coordinates of the entire configuration of the intermediate turbine article 400 including both external and internal surfaces of an airfoil, platform and dovetail of the turbine component portion 410, as well as the first and second structural bridge devices 420 and 430. In one exemplary embodiment, the model may include a number of successive 2D cross-sectional slices that together form the 3D component.

In step 320, which includes a number of sub-steps 321-324 discussed in greater detail below, the intermediate turbine article 400 is produced according to the model of step 310 using a rapid prototyping or additive layer manufacturing process. Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the intermediate turbine article 400. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS).

As such, in one exemplary embodiment, step 320 is performed with DMLF techniques to form the intermediate turbine article 400. However, prior to a discussion of the sub-steps of step 320, reference is made to FIGS. 5 and 6, which are schematic views of a DMLF system 500 for manufacturing the intermediate turbine article 400 of FIG. 4 in accordance with an exemplary embodiment.

Figure 5:
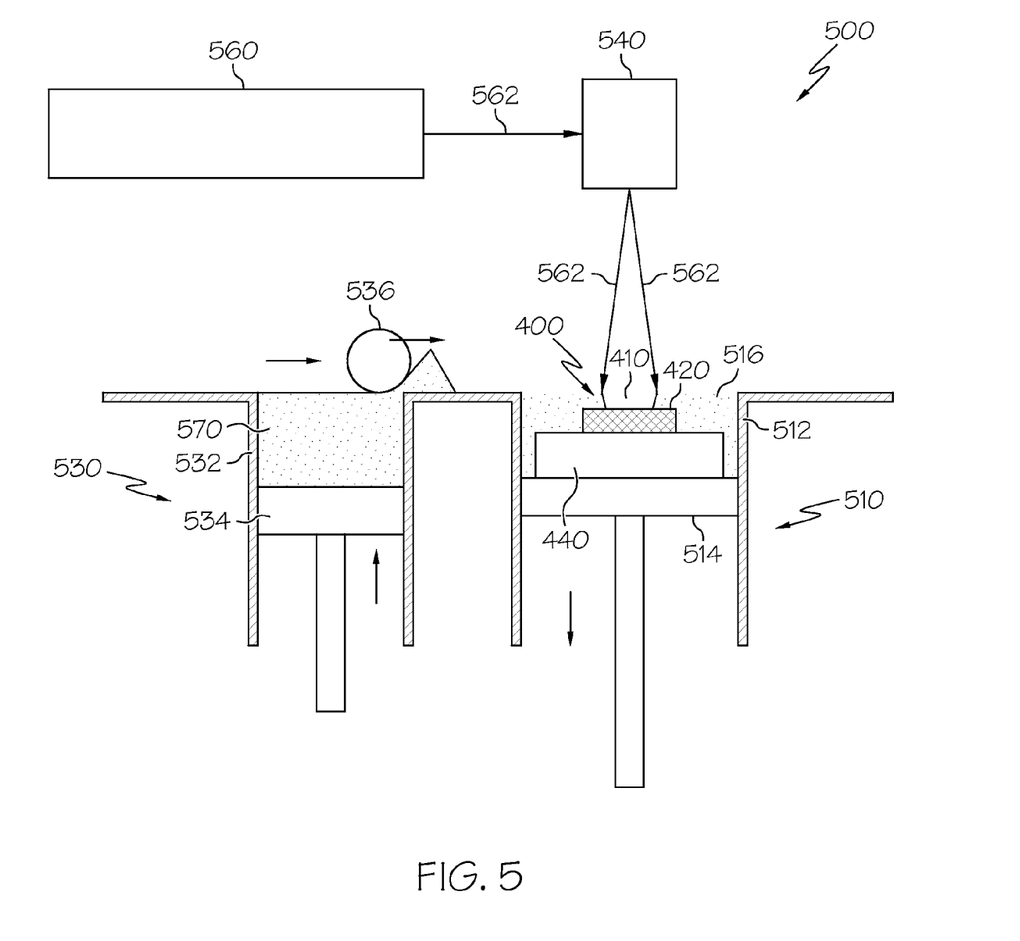
FIG. 5 is a schematic view of a system for manufacturing the intermediate turbine article of FIG. 4 according to the method of FIG. 3 in accordance with an exemplary embodiment.
Figure 6:
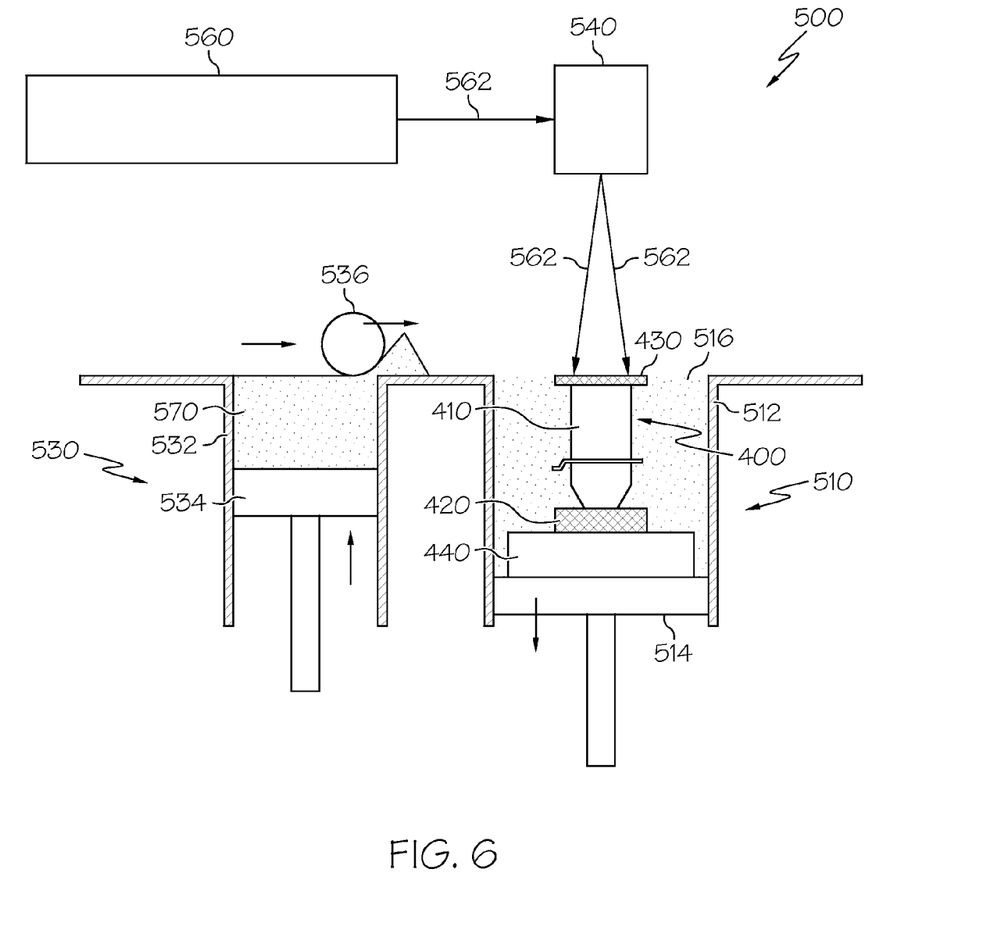
FIG. 6 is another schematic view of the system of FIG. 5 in accordance with an exemplary embodiment.

Referring to FIGS. 5 and 6, the system 500 includes a fabrication device 510, a powder delivery device 530, a scanner 540, and a laser 560 that function to manufacture the intermediate turbine article 400 with build material 570. The fabrication device 510 includes a build container 512 with a fabrication support 514 on which the intermediate turbine article 400 is formed and supported. The fabrication support 514 is movable within the build container 512 in a vertical direction and is adjusted in such a way to define a working plane 516. The delivery device 530 includes a powder chamber 532 with a delivery support 534 that supports the build material 570 and is also movable in the vertical direction. The delivery device 530 further includes a roller or wiper 536 that transfers build material 570 from the delivery device 530 to the fabrication device 510.

During operation, the base block 440 for the intermediate turbine article 400 is installed on the fabrication support 514. The fabrication support 514 is lowered and the delivery support 534 is raised. The roller or wiper 536 scrapes or otherwise pushes a portion of the build material 570 from the delivery device 530 to form the working plane 516 in the fabrication device 510. The laser 560 emits a laser beam 562, which is directed by the scanner 540 onto the build material 570 in the working plane 516 to selectively fuse the build material 570 into a cross-sectional layer of the intermediate turbine article 400 according to the design. More specifically, the speed, position, and other operating parameters of the laser beam 562 are controlled to selectively fuse the powder of the build material 570 into larger structures by rapidly melting the powder particles that may melt or diffuse into the solid structure below, and subsequently, cool and resolidify. As such, based on the control of the laser beam 562, each layer of build material 570 will include unfused and fused build material 570 that respectively corresponds to the cross-sectional passages and walls that form the intermediate turbine article 400. In general, the laser beam 562 is relatively low power to selectively fuse the individual layer of build material 570. As an example, the laser beam 562 may have a power of approximately 50 to 500 Watts, although any suitable power may be provided.

Upon completion of a respective layer, the fabrication support 514 is lowered and the delivery support 534 is raised. Typically, the fabrication support 514, and thus the intermediate turbine article 400, does not move in a horizontal plane during this step. The roller or wiper 536 again pushes a portion of the build material 570 from the delivery device 530 to form an additional layer of build material 570 on the working plane 516 of the fabrication device 510. The laser beam 562 is movably supported relative to the intermediate turbine article 400 and is again controlled to selectively form another cross-sectional layer of the intermediate turbine article 400. As such, the intermediate turbine article 400 is positioned in a bed of build material 570 as the successive layers are formed such that the unfused and fused material supports subsequent layers. This process is continued according to the modeled design as successive cross-sectional layers are built into the completed intermediate turbine article 400.

The delivery of build material 570 and movement of the intermediate turbine article 400 in the vertical direction are relatively constant and only the movement of the laser beam 562 must be selectively controlled to provide a simpler and more precise implementation. The localized fusing of the build material 570 enables more precise placement of fused material to reduce or eliminate the occurrence of over-deposition of material and excessive energy or heat, which may otherwise result in cracking or distortion. The unused and unfused build material 570 may be reused, thereby further reducing scrap.

Any suitable laser and laser parameters may be used, including considerations with respect to power, laser beam spot size, and scanning velocity. The build material 570 may be formed by any suitable powder, including powdered metals, such as a stainless steel powder, and alloys and super alloy materials, such as nickel-based or cobalt superalloys. In one exemplary embodiment, the build material 570 is a high temperature nickel base super alloy such as MAR-M-247. In other embodiments, IN718 or IN738 or other suitable alloys may be employed. The powder build material 570 may be selected for enhanced strength, durability, and useful life, particularly at high temperatures. Each successive layer may be, for example, between 10 μm and 200 μm, although the thickness may be selected based on any number of parameters.

As noted above, the system 500 of FIG. 5 builds the intermediate turbine article 400 in sequential layers. As an example, FIG. 6 is another schematic view of the system 500 subsequent to the view in FIG. 5. As such, in the view of FIG. 5, the first structural bridge device 420 and a portion of the turbine component portion 410 have been formed by the sequential layers of build material 570. By comparison, in the view of FIG. 6, the first structural bridge device 420, the turbine component portion 410, and a portion of the second structural bridge device 430 have been formed by the sequential layers of build material 570. Subsequent to FIG. 6, the remaining layers of the second structural bridge device 430 are formed to complete the intermediate turbine article 400.

As such, now referring again to FIG. 3 and more specifically to sub-steps 321-324 in step 320, the base block 440 is initially installed in the system 500 in sub-step 321. In sub-step 322, the first structural bridge device 420 of the intermediate turbine article 400 is formed on the base block 440 by melting and solidifying layers of build material 570 according to the model of the intermediate turbine article 400 from step 310. Additional details about the first structural bridge device 420 are provided below, but in general, the first structural bridge device 420 provides thermal isolation between the base block 440 and the rest of the intermediate turbine article 400 as well as structural restraint and dimensional control for maintaining the shape of the turbine component portion 410 during the processing steps discussed below. In one exemplary embodiment, the first structural bridge device 420 is built directly off the base block 440, and the turbine component portion 410 is likewise built directly off the first structural bridge device 420. Although not shown, the base block 440 may also undergo resistance or hydraulic heating to minimize a thermal gradient between the intermediate turbine article 400 and the base block 440. The base block heating temperature may be high enough to reduce the thermal gradient between the base block 440 and the turbine component portion 410 during DMLF fabrication, but not so high as to cause sintering or caking of the powder metal build material 570 in the build container 512.

In sub-step 323, the turbine component portion 410 is manufactured on the first structural bridge device 420 in the system 500. In particular, successive layers of melted and solidified build material 570 are formed according to the model of the turbine component portion 410 from step 310.

In sub-step 324, a second structural bridge device 430 is manufactured on the turbine component portion 410 in the system 500. In particular, successive layers of melted and solidified build material 570 are formed according to the model of the second structural bridge device 430 from step 310. Formation of the second structure bridge device 430 completes the intermediate turbine article 400 in step 320. Although step 320 discusses forming the intermediate turbine article 400 with DMLF, other additive processes or techniques may be used.

In step 330, the intermediate turbine article 400 and the base block 440 are removed from the system 500 and positioned in a stress relief oven (not shown). In step 340, a heat shield (e.g., a radiation shield or thermal isolation cover) may be placed on selected portions of the intermediate turbine article 400 to control heating or cooling patterns of the subsequent steps. In one exemplary embodiment, the heat shield or thermal isolation cover is placed to insulate the areas of the turbine component portion 410 that have small thermal mass or low heat capacitance. This reduces the thermal gradient in the turbine component portion 410 during stress relief, thus minimizing transient thermal stresses in the turbine component portion 410 that arise during heating of the intermediate turbine article 400 to stress relieving temperatures. In some embodiments, step 340 may be omitted.

In step 350, the intermediate turbine article 400 undergoes stress relief heat treatment. Particularly, the temperature in stress relief oven is increased to release the concentrated stresses in the intermediate turbine article 400. As discussed below, the second structural bridge device 430 functions to maintain the dimensions of the turbine component portion 410 during this stress relief step. Additionally, the heat shield provided in step 340 may enable a more consistent and desirable heating or cooling pattern, as noted above.

In step 360, the intermediate turbine article 400 is removed from the base block 440 and the first and second structural bridge devices 420 and 430 are removed from the turbine component portion 410 of the intermediate turbine article 400. The first and second structural bridge devices 420 and 430 may be removed with electrical discharge machining (EDM), as an example.

In step 370, the turbine component portion 410 may undergo additional finishing or processing treatments. Such treatments may include, for example, aging, annealing, quenching, peening, polishing, hot isostatic pressing (HIP), or coatings. One example of a post-laser fusion process of step 370 is a HIP process in which an encapsulation layer is applied to the turbine component portion 410 and pressure and heat are applied to remove or reduce any porosity and cracks internal to or on the surface of the turbine component portion 410. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer. In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity. In some exemplary embodiments, no such finishing treatments are necessary and step 370 may be omitted.

Upon completion of the step 370, the method 300 may proceed to step 380 in which the turbine component portion 410 is machined to the final specifications. The machining techniques may include, for example, the addition of a tip cap, formation of cooling holes, and grinding the rotor tips. At this point, the turbine component portion 410 corresponds to the completed turbine component 200 shown in FIG. 2. In further steps (not shown), the turbine component 200 may be tested and installed in a turbine section of a gas turbine engine, as shown in FIG. 1.

Figure 7:
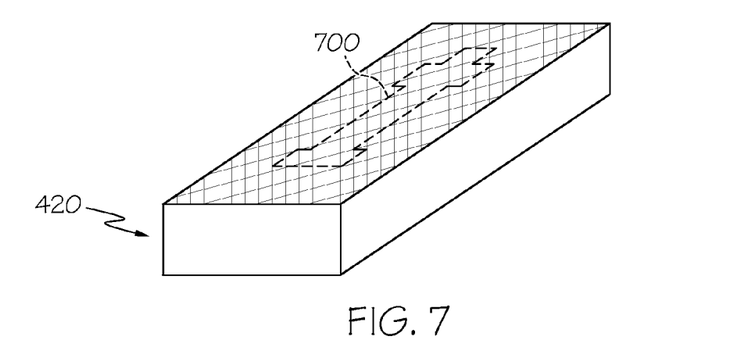
FIG. 7 is an isometric view of a first structural bridge device of the intermediate turbine article of FIG. 4 in accordance with an exemplary embodiment.

FIG. 7 is an isometric view of the first structural bridge device 420 of the intermediate turbine article 400 of FIG. 4 in accordance with an exemplary embodiment. In the view of FIG. 7, the first structural bridge device 420 has been removed from the base block 440 and the turbine component portion 410. As noted above, the first structural bridge device 420 is formed on the base block 440 and supports the turbine component portion 410, as indicated by outline 700, during the DMLF process of step 320 and the stress relief heat treatment of step 340.

In particular, the first structural bridge device 420 functions to thermally isolate the turbine component portion 410 from the base block 440. As noted above, the DMLF techniques of step 320 build the turbine component portion 410 in sequential cross-sectional layers of build material that are melted by a laser and solidified. As such, during the DMLF process, the upper layers are more recently formed, and thus, at a higher temperature than previously formed layers. As such, all of the layers are in various stages of cooling during the process, and the base block 440 is at a lower temperature than most or all of the layers of the turbine component portion 410. As discussed below, the first structural bridge device 420 tends to mitigate the impact of these thermal differences.

Figure 8:
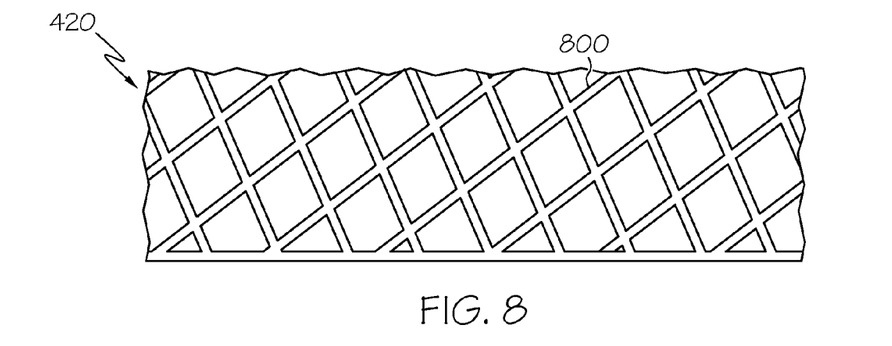
FIG. 8 is a more detailed view of the first structural bridge device of FIG. 7 in accordance with an exemplary embodiment.

Reference is additionally made to FIG. 8, which is a more detailed view of the first structural bridge device 420 of FIG. 7 in accordance with an exemplary embodiment. As shown, the first structural bridge device 420 is relatively porous and may have a honeycomb cross-sectional structure 800. In other embodiments, the cross-sectional area is formed by a lattice, strands, or other high porosity structure. Since heat loss is proportional to cross-sectional area, the reduced cross-sectional area of the first structural bridge device 420 inhibits the thermal conductance of a thermal path between the turbine component portion 410 and the base block 440. Thus, the first structural bridge device 420 inhibits heat from flowing from the higher temperature turbine component portion 410 to the lower temperature base block 440. In effect, the first structural bridge device 420 prevents or inhibits the base block 440 from acting as a heat sink that draws heat from the intermediate turbine article 400. In one exemplary embodiment, the cross sectional area of the first structural bridge device 420 is reduced to create a porosity of 67% to 90%, which effectively reduces the thermal conductance of the first structural bridge device 420 by a factor of 3 to 10 compared to a solid first structural bridge device 420 without reduced cross sectional area. In other embodiments, the porosity may be more or less than the above mentioned range if desired to maintain structural rigidity or obtain acceptable thermal gradients between the base block 440 and the turbine component portion 410. Accordingly, the first structural bridge device 420 may inhibit thermal gradients from forming within the intermediate turbine article 400, either during the DMLF process of step 320 and/or during the stress relief treatment of step 350. The reduction in thermal gradients enables heating or cooling of the intermediate turbine article 400 in a more uniform and consistent manner, thereby reducing or eliminating thermal stresses and resulting cracks.

In addition to the thermal isolation, the first structural bridge device 420 functions as a structural restraint to maintain dimensional control of the turbine component portion 410 during the stress relief treatment of step 350. This further reduces or eliminates thermal stresses and resulting cracks. Various embodiments of thermal resistance and structural restraints are acceptable (such as honeycombs, lattices, strands, or other high porosity structures) as long as they provide acceptable thermal isolation and structural restraint.

Figure 9:
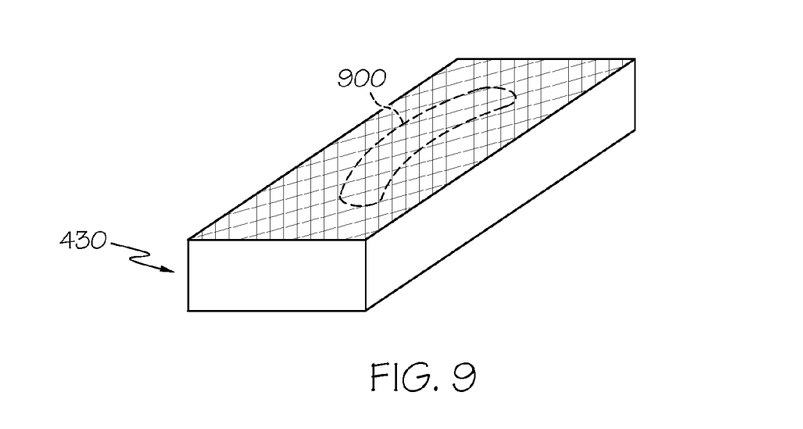
FIG. 9 is an isometric view of a second structural bridge device of the intermediate turbine article of FIG. 4 in accordance with an exemplary embodiment.

FIG. 9 is an isometric view of the second structural bridge device 430 of the intermediate turbine article 400 of FIG. 4 in accordance with an exemplary embodiment. In the view of FIG. 9, the second structural bridge device 430 has been removed from the turbine component portion 410. As noted above, the second structural bridge device 430 restrains the turbine component portion 410 as the intermediate turbine article 400 undergoes the stress relief treatment of step 350. The turbine component portion 410 adjacent to the second structural bridge device 430 corresponds to the tip 212 of the finished turbine component 200 (FIG. 2). The tip 212 (FIG. 2) may have relatively thin walls in which, without the second structural bridge device 430, thermal stresses may accumulate. Instead, the second structural bridge device 430 functions to restrain the turbine component portion 410, particularly at the tip 212 (FIG. 2), as indicated by outline 900, to minimize the thermal stresses and resulting cracks in the thermal component portion 410. As an example, the second structural bridge device 430 may prevent the adjacent turbine component portion 410 from over-expanding or over-contracting during heating or cooling in excess of an extent that would result in permanent deformation and/or unacceptable thermal stresses. Otherwise, the resulting stresses at the edges of the turbine component portion 410 (e.g., the tip 212 of FIG. 2) may result in component distortion and/or cracking. In some embodiments, the second structural bridge device 430 serves to restrain the edges of the turbine component portion 410 to the design intent geometry during stress relief, serves to minimize stress concentrations at the edges of the turbine component portion 410 during stress relief, and may attenuate the thermal gradients in the turbine component portion 410 that may cause unacceptably high stresses to occur during stress relief that may otherwise result in distortion and/or cracking of the turbine component portion 410.

In general, the second structural bridge device 430 may have a cross-sectional configuration similar to that of the first structural bridge device 420 shown in FIG. 8, e.g., a relatively porous honeycomb-shape. In other embodiments, the second structural bridge device 430 may have a solid or strand-type cross-sectional area. In general, the cross-sectional area may be controlled to provide the desired level of compliance to restrain or absorb stresses from the turbine component portion 410 and/or to control the expansion of the second structural bridge device 430 relative to the turbine component portion 410. FIGS. 7-9 illustrate one particular exemplary embodiment of the first and second structural bridge devices 420 and 430. In other embodiments, the first and second structural bridge devices 420 and 430 may have other shapes, sizes, or configurations to provide the desired characteristics discussed above.

The method 300 has been discussed above with reference to the formation of a single intermediate turbine article 400, and thus, a single turbine component. However, in one exemplary embodiment of the method 300, more than one intermediate turbine article may be manufactured simultaneously. Unless otherwise noted, method 300 in this embodiment proceeds as discussed above. In this embodiment of the method 300, the intermediate turbine articles are formed on a common base block (e.g., base block 440) to provide a common orientation and a known point of reference and formed as discussed above. Successive layers can be formed for the group of intermediate turbine articles simultaneously according to a common module or design. For example, the powdered metal may be deposited across a single working plane and one or more lasers may selectively fuse the layers of each intermediate turbine article, either sequentially or simultaneously. The intermediate turbine articles may then be lowered together for the formation of the next layer. Simultaneous fabrication of a number of components may minimize cost and variability of the manufacturing process.

Accordingly, exemplary embodiments may enhance turbine components fabricated with additive manufacturing techniques, including DMLF. These methods enable rapid prototyping and manufacturing while reducing cracks and other issues. Rapid prototyping reduces costs and cycle time in the engine design, particularly in the iterative environment of engine design. Additionally, exemplary embodiments may produce turbine components capable of withstanding higher temperatures and stresses, thereby leading to further improvements in engine performance. Exemplary embodiments are applicable to both commercial and military gas turbine engines and auxiliary power units, including industrial applications such as electricity generation, naval propulsion, pumping sets for gas and oil transmission, aircraft and/or spacecraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for manufacturing an engine component, comprising the steps of:
   providing a structural bridge device on a base block;
   forming a component portion on the structural bridge device with an additive manufacturing technique;
   removing the component portion from the base block and the structural bridge device; and
   finishing the component portion to form the engine component,
   wherein the providing step includes providing the structural bridge device on the base block with the additive manufacturing technique of the forming step,
   wherein the structural bridge device is a first structural bridge device, and wherein the method further comprises the step of providing, after the forming step, a second structural bridge device on the component portion with the additive manufacturing technique,
   further comprising the step of, after the forming step, heating the component portion, the first structural bridge device, and the second structural bridge device in a stress relief treatment.

2. The method of claim 1, wherein the forming step includes direct metal laser fusing sequential layers of build material into the component portion.

3. The method of claim 1, wherein the providing step includes providing the structural bridge device such that the structural bridge device thermally isolates the component portion from the base block during the forming step.

4. The method of claim 1, wherein the providing step includes forming the structural bridge device on the base block by direct metal laser fusing sequential layers of build material on the base block.

5. The method of claim 1, wherein the step of providing the second structural bridge device includes forming the second structural bridge device by direct metal laser fusing sequential layers of build material on the component portion, and wherein, prior to the finishing step, the method further comprises removing the second structural bridge device.

6. The method of claim 1, wherein the removing step includes removing the second structural bridge device from the component portion.

7. The method of claim 1, wherein the heating step includes maintaining dimensional control of the component portion with at least one of the first structural bridge device or the second structural bridge device.

8. The method of claim 1, further comprising the step of heating the base block during or prior to the providing step, wherein the heating step includes resistance or hydraulic heating.

9. The method of claim 1, wherein the providing step includes providing the structural bridge device with a porous honeycomb cross-sectional structure.

10. The method of claim 1, wherein the providing step includes providing the structural bridge device with a porous lattice structure.

11. The method of claim 1, wherein the finishing step includes performing a hot isostatic process (HIP) and an encapsulation process on the component portion.

12. The method of claim 11, further comprising the step of, after the heating step and prior to the finishing step, removing the first structural bridge device and the second structural bridge device from the component portion.

* * * * *